United States Patent
Smith (10) Patent No.: US 10,756,775 B2
(45) Date of Patent: Aug. 25, 2020

(54) ACTIVE GEO-LOCATION RANGE FOR WLAN DEVICES

(71) Applicant: SR Technologies, Inc., Sunrise, FL (US)

(72) Inventor: Graham K. Smith, Boca Raton, FL (US)

(73) Assignee: SR Technologies, Inc., Sunrise, FL (US)

( * ) Notice: Subject to any disclaimer, the term of this patent is extended or adjusted under 35 U.S.C. 154(b) by 0 days.

(21) Appl. No.: 16/589,627

(22) Filed: Oct. 1, 2019

(65) Prior Publication Data

US 2020/0119765 A1    Apr. 16, 2020

Related U.S. Application Data

(60) Provisional application No. 62/744,459, filed on Oct. 11, 2018.

(51) Int. Cl.
| | |
|---|---|
| *H04B 1/707* | (2011.01) |
| *H04L 5/00* | (2006.01) |
| *H04W 74/08* | (2009.01) |
| *H04W 64/00* | (2009.01) |
| *H04L 1/16* | (2006.01) |
| *H04B 17/336* | (2015.01) |
| *H04W 80/02* | (2009.01) |

(52) U.S. Cl.
CPC ....... *H04B 1/70718* (2013.01); *H04B 17/336* (2015.01); *H04L 1/1671* (2013.01); *H04L 5/0055* (2013.01); *H04W 64/003* (2013.01); *H04W 74/0816* (2013.01); *H04W 80/02* (2013.01)

(58) Field of Classification Search
CPC .............. H04B 1/70718; H04B 1/7073; H04B 1/70735; H04B 1/7075; H04B 1/70752; H04B 1/70753; H04B 1/7093; H04B 1/7095; H04B 17/336; H04W 74/0816; H04W 64/003; H04W 80/02; H04L 1/1671; H04L 5/0055
See application file for complete search history.

(56) References Cited

U.S. PATENT DOCUMENTS

| | | | |
|---|---|---|---|
| 7,239,894 B2 * | 7/2007 | Corbett ................ | H04B 7/0837 455/11.1 |
| 2018/0011162 A1 * | 1/2018 | Bovard ................. | G01S 5/0231 |

* cited by examiner

*Primary Examiner* — Siu M Lee
(74) *Attorney, Agent, or Firm* — Christopher & Weisberg, P.A.

(57) ABSTRACT

A method and devices are disclosed that increase the range of active geo-location from the airborne measuring station as compared with known methods by increasing the effective receive sensitivity of the airborne measuring station. In one embodiment this may be accomplished by transmitting a predetermined ranging packet and correlating the raw received bit stream of the response packet with the predetermined bit stream. In one embodiment, the disclosed method applies to the reception of IEEE 802.11 direct sequence spread spectrum DSSS ACK and DSSS CTS packets in response to DSSS data null and DSSS RTS packets respectively, in the 2.4 GHz band.

21 Claims, 9 Drawing Sheets

ACTIVE GEO-LOCATION RANGE FOR WLAN DEVICES

CROSS-REFERENCE TO RELATED APPLICATIONS

This application claims priority to U.S. Provisional Application No. 62/744,459, filed Oct. 11, 2018, entitled "ACTIVE GEO-LOCATION RANGE FOR WLAN DEVICES", the entirety of which is incorporated herein by reference.

TECHNICAL FIELD

The present disclosure relates to geo-location of wireless devices, and in particular to a method and system for the geo-location of wireless local area network (WLAN) devices.

BACKGROUND

Initially, it is noted that IEEE Standard 802.11-2016 is used as the base reference for disclosures used herein, the entire contents of which are incorporated herein by reference. The IEEE 802.11-2016 Standard is commonly referred to as "Wi-Fi" and is referred to as such herein.

The location of wireless devices can be performed by various methods. These methods may be classified as active, passive and combined active and passive. In an active location scheme, a device that is determining the location or range, the measuring device, transmits certain packets to the device being located, i.e., the target device, and a common method is to measure the time of arrival (TOA) of the response from the target device and compare that to the time of departure (TOD) that the packet was transmitted by the measuring device so as to determine the round trip time, RTT.

In such location systems it is common to use multiple measuring devices to determine the location. In such a scheme, simultaneous TOA and/or TOD measurements are taken by different measuring devices situated at different points, and the location of the target device calculated.

In an active location scheme, TOD may be measured for a packet that is transmitted from the measuring station addressed to the target station. The TOA of the response from the target station at the measuring station is then also measured. If the turnaround time for the target station to receive the packet from the measuring station and to start to transmit the response is known, then the time difference at the measuring station between the TOA and the TOD, minus the turnaround time at the target station will be directly proportional to twice the distance of the target station from the measuring station. For example, if the target station is a wireless device based upon IEEE 802.11 technology, and if the packet transmitted from the measuring station to the target station is a data packet, the response from the target station will normally be an acknowledgement (ACK) packet. If the packet transmitted from the measuring station to the target station is a control packet, for example a ready-to-send (RTS) packet, then the response from the target station will normally be a clear-to-send (CTS) packet. In these two examples, the turnaround time at the target station is defined in the IEEE 802.11 standard as the short interframe spacing (SIFS), which is a preset value. Hence, the time delay, td, between the measuring station and the target station, may be determined from the calculation td=(TOA−TOD SIFS)/2 and the distance between the measuring station and the target station is then c*td, where c is the speed of light. This method of estimating the distance to a target station by measuring the TOD and TOA and accounting for the turnaround time is known in the art.

Figure 1:
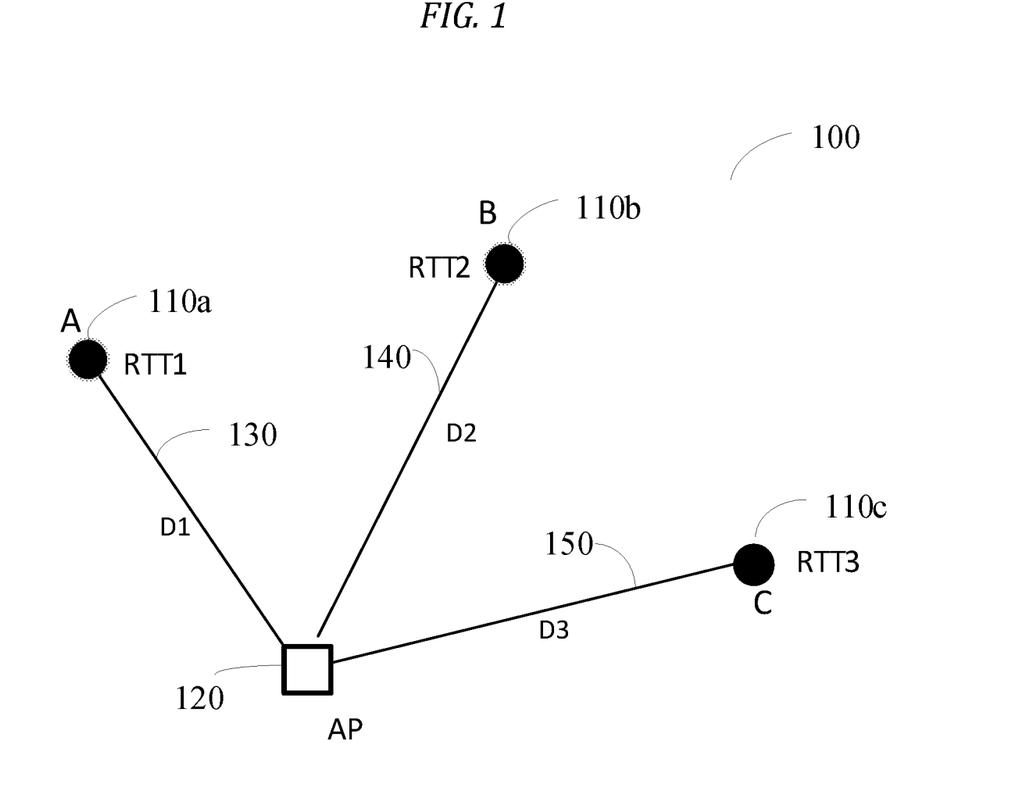
FIG. 1 is a diagram of a typical location system which includes three measuring stations.

FIG. 1 is a diagram of a typical location system 100 which includes three measuring stations 110a, 110b and 110c (referred to collectively herein as "measuring stations" or "measuring receivers"). The target station 120 may be a wireless device, such as, for example, an Access Point (AP) that is to be located by the three measuring stations 110. The distance of the target station 120 from measuring station 110a is D1, 130. The distance of the target station 120 from measuring station 110b is D2, 140. The distance of the target station 120 from measuring station 110c is D3, 150. The round trip time, RTT1, determined from the calculation RTT=(TOA−TOD−SIFS), is measured for transmissions from measuring station 110a and this can used to calculate the distance D1 130 using the formula D1=RTT1/2c where c is the speed of light. Similarly, RTT2 and RTT3 measurements result in the determination of distances D2 140 and D3 150. The methods for calculating the location of target station 120 using the distances D1 130, D2 140 and D3 150 are well known in the art.

Figure 2:
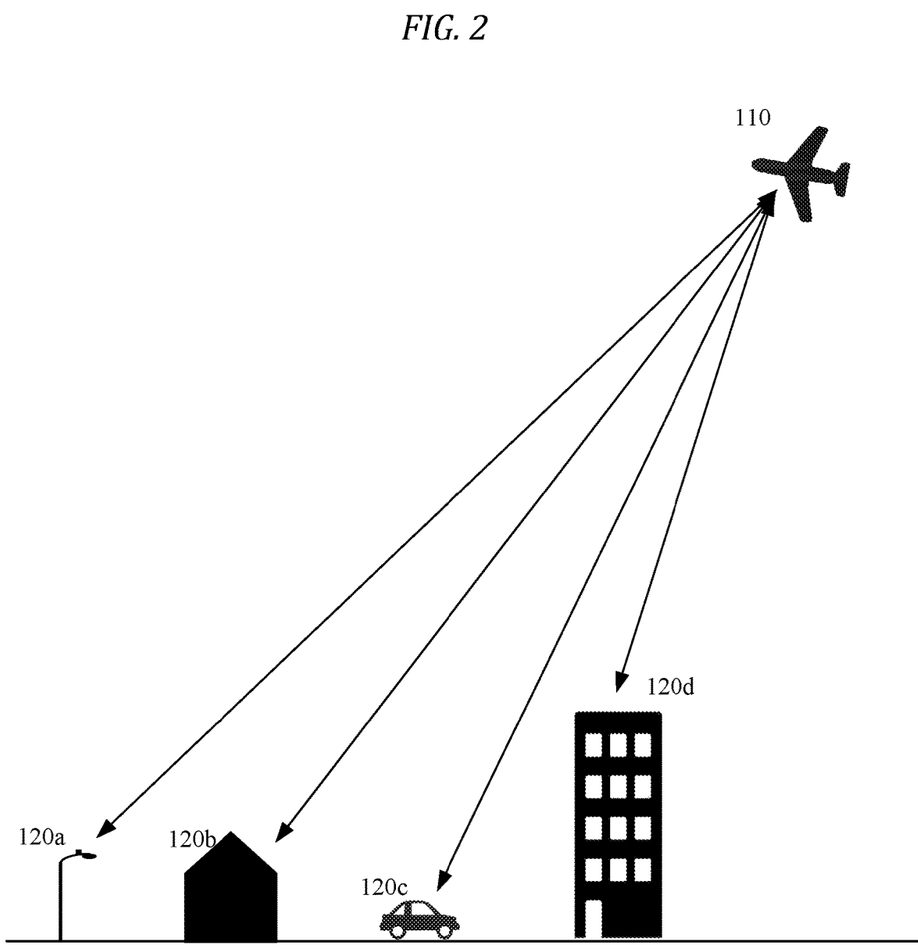
FIG. 2 is a diagram of an airborne measuring station actively geo-locating target stations.

FIG. 2 is a diagram of an airborne measuring station 110 actively geo-locating target stations 120a, 120b, 120c and 120d. The target station 120a depicts the example of an outdoor device, target station 120b depicts the example of a device inside a residential home, target station 120c depicts the example of a device inside an automobile, and target station 120d depicts the example of an apartment. The obstruction losses for each of the target stations 120a, 120b, 120c and 120d will differ and hence the maximum range at which the airborne measuring station 110 can successfully geo-locate the target stations will differ because the radio frequency (RF) obstruction losses will vary between the target stations. From the airborne measuring station's 110 perspective, the range will be dependent upon two factors: the transmit power of the ranging packet 212, which should be such that the target station will successfully receive it, and the receive sensitivity of the airborne measuring station 110 such that the response packet 224 is received successfully. Transmitting the ranging packet 212 at a sufficiently high power is straightforward, e.g., a higher power amplifier and/or a higher gain antenna, but the receive sensitivity of the airborne measuring station 110 is generally restricted to the noise figure of the receiver.

The signal level, Pr, received at the airborne measuring station 110 is:

$$Pr = Pt + G_1 + G_2 - L_{fs} - Lo \quad (5)$$

where Pt=Transmit power from the target station 120;
$G_1$=Antenna gain at the airborne measuring station;
$G_2$=Antenna gain at the target station;
$L_{fs}$=Propagation loss, free space; and
Lo=Obstruction loss.

The obstruction loss, Lo, for the path from the target station 120a and the airborne measuring station 110 can be assumed to be zero as the target station 120a has a line-of-sight path to the airborne measuring station 110. In contrast, the obstruction losses for the other target stations may be in the order of 10 dB for target station 120b, 6 dB for target station 120c and 15-20 dB for target station 120d. There is a problem in that the range of the airborne measuring station 110 to successfully detect the response packets from each of these target stations is limited due to the fixed sensitivity of the measuring receiver of airborne station 110 which is restricted by the noise figure of the receiver and the need to receive a packet without errors.

SUMMARY

A method, wireless device and airborne station for improving sensitivity of a determination of geo-location of a wireless device so that a longer range of location determination is achievable.

According to one aspect, a method for improving the sensitivity of a determination of wireless device geo-location is provided by correlation of raw bits of a received sequence with a raw bits of an expected sequence to achieve a significant processing gain over known methods. The method includes transmitting a ranging signal and recording a time of transmitting the ranging signal. The method further includes receiving a direct sequence spread spectrum, DSSS, signal transmitted from a second WD in response to the ranging signal. The received DSSS signal is demodulated and de-spread to produce a received sequence. An expected sequence is also determined. The method includes correlating raw bits of the received sequence with raw bits of the expected sequence to determine a correlation value, the correlation value being indicative of an extent to which received sequence matches the expected sequence. The process also includes comparing the correlation value to a predetermined threshold, T. When the correlation value exceeds the threshold, T, then the time of reception of the received DSSS response signal is recorded, and a geo-location of the second WD is determined based at least in part on the time of transmission of the ranging signal and the time of reception of the DSSS response signal.

According to this aspect, in some embodiments, the transmitted ranging signal is one of a return-to-send, RTS, signal and a data null signal. In some embodiments, the method further includes determining parameters of the ranging signal by one of selecting a WD receiver address, RA, to be used as a medium access control, MAC, address of the second WD, selecting a MAC address to be used as a wireless transmitter address, TA, and selecting a duration value. In some embodiments, the determination of the raw bits of the expected sequence includes: constructing the medium access control, MAC, header bits based on using a transmitter address, TA, of the ranging signal as a receiver address, RA, of the DSSS response signal; add preamble and header bits to the MAC header bits to produce a packet; and scramble the packet using a predetermined seed to produce the raw bits of the expected sequence. In some embodiments, a likelihood of correctly determining that a valid ranging signal has been received is greater when the determination is based on correlation than when the determination is based on a frame checksum. In some embodiments, the method further includes determining a time associated with the received sequence when a valid ranging signal has been received. In some embodiments, the threshold, T, depends at least in part on a bit error probability, Pb, the bit error probability, Pb, being based on a signal to noise ratio (SNR). In some embodiments, the threshold, T, in percent is given by T=100 (1-2 Pb). In some embodiments, the expected sequence includes a 304 bit sequence that includes up to 96 unique bits and at least one field of variable bits. In some embodiments, the method further includes receiving a subsequent spread spectrum signal when the threshold, T, is not exceeded for a predetermined time.

According to another aspect, a first wireless device (WD) includes a transceiver configured to transmit a ranging signal and receive a direct sequence spread spectrum, DSSS, signal from a second WD in response to the ranging signal. The first WD also includes processing circuitry in communication with the receiver, the processing circuitry configured to: de-spread the received DSSS signal to produce a received sequence; and determine an expected sequence. A correlator in communication with the processing circuitry is configured to: correlate raw bits of the received sequence with raw bits of the expected sequence to determine a correlation value, the correlation value being indicative of an extent to which the received sequence matches the expected sequence. The processing circuitry is further configured to: compare the correlation value to a predetermined threshold, T, and when the correlation value exceeds the threshold, T, then: record a time of reception of the received DSSS response signal and determine a geo-location of the second WD based at least in part on a time of transmission of the ranging signal and the time of reception of the DSSS response signal.

According to this aspect, in some embodiments, the transmitted ranging signal is one of a return-to-send, RTS, signal and a data null signal. In some embodiments, the processing circuitry is further configured to determine parameters of the ranging signal by one of selecting a WD receiver address, RA, to be used as a medium access control, MAC, address of the second WD, selecting a MAC address to be used as a wireless transmitter address, TA, and selecting a duration value. In some embodiments, the determination of the raw bits of the expected sequence includes: constructing the medium access control, MAC, header bits based on using a transmitter address, TA, of the ranging signal as a receiver address, RA, of the DSSS response signal; add preamble and header bits to the MAC header bits to produce a packet; and scramble the packet using a predetermined seed to produce the raw bits of the expected sequence. In some embodiments, a likelihood of correctly determining that a valid ranging signal has been received is greater when the determination is based on correlation than when the determination is based on a frame checksum. In some embodiments, the processing circuitry is further configured to determine a time associated with the received sequence when a valid ranging signal has been received. In some embodiments, the threshold, T, depends at least in part on a bit error probability, Pb, the bit error probability, Pb, being based on a signal to noise ratio (SNR). In some embodiments, the threshold, T, in percent is given by T=100 (1-2 Pb). In some embodiments, the expected sequence includes a 304 bit sequence that includes up to 96 unique bits and at least one field of variable bits. In some embodiments, the transceiver is further configured to receive a subsequent spread spectrum signal when the threshold, T, is not exceeded for a predetermined time.

According to yet another embodiment, an airborne station has a transceiver and processing circuitry configured to increase the range of locating a wireless device is provided. The transceiver is configured to: transmit a ranging signal, the ranging signal being one of a return-to-send, RTS, signal and a data null signal; and receive a direct sequence spread spectrum, DSSS, signal from a ground station, the signal being spread by an 11 bit barker code. The processing circuitry is configured to: de-spread the received DSSS signal to produce a received sequence, the received sequence having one of a Clear To Send (CTS) signal and an acknowledgement (ACK) signal and obtain an expected sequence. The processing circuitry is further configured to correlate the received sequence with the expected sequence to determine a correlation value, the correlation value being indicative of an extent to which the received sequence matches the expected sequence. The process also includes comparing the correlation value to a threshold, T, the threshold, T, being based on a bit error probability, which in turn is based on a signal to noise ratio (SNR). When the correlation value exceeds the threshold, T, the processing circuitry is further configured to determine a time associated with the received sequence and determine a range of the WD based on the time associated with the received sequence.

BRIEF DESCRIPTION OF THE DRAWINGS

A more complete understanding of the present disclosure, and the attendant advantages and features thereof, will be more readily understood by reference to the following detailed description when considered in conjunction with the accompanying drawings wherein.

DETAILED DESCRIPTION

In one embodiment of the present disclosure, a single airborne measuring station 110 is used. A method and devices are disclosed that increase the range of active geo-location from the airborne measuring station 110 as compared with prior methods and systems by increasing the effective receive sensitivity of the airborne measuring station 110. In some embodiments, the disclosed method applies to the reception of direct sequence spread spectrum DSSS ACK and CTS packets in response to data null and RTS packets respectively, in the 2.4 GHz band.

Figure 3:
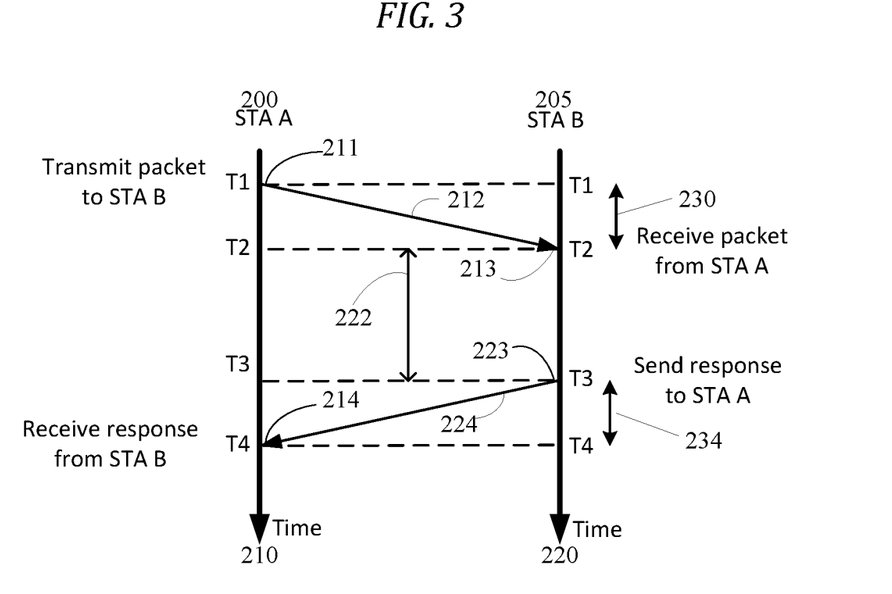
FIG. 3 is a timing diagram that describes the ranging method of the present disclosure that may be used to determine the distance between two wireless devices.

FIG. 3 is a timing diagram that describes a ranging method of the present disclosure that may be used to determine the distance between two wireless devices, wireless device STA A 200 and wireless device STA B 205. In one embodiment, one of the wireless devices (i.e., one of STA A 200 and STA B 205) may be target station 120. In another embodiment, at least one of wireless devices (i.e., at least one of STA A 200 and STA B 205) is measuring station 110. Time axis 210 refers to the time axis for STA A 200 and time axis 220 refers to the time axis for STA B 205. At time T1 211, STA A 200 transmits a packet to STA B 205. This transmission 212 is received at STA B 205 at time T2 213. The propagation time of the transmission 212 is (T2−T1) 230. STA B 205 transmits a response 224 at time T3 223. The time 222 that has elapsed between the reception of the packet at time T2 213 and the transmission at time T3 223 is the turnaround time at STA B 205. Ideally the turnaround time 222 at STA B will be equal in duration to SIFS. At time T4 214, STA A 200 receives the response 224 from STA B 205. The propagation time of the transmission 224 is (T4−T3) 234. It should be noted that the time differences 230 (T2−T1) and 234 (T4−T3) represent the propagation time, td, of the transmissions and should be equal assuming the distance between the two stations has not changed. The total time that elapses between the transmission 212 and the response 224 at STA A 200 is:

$$(T2-T1)+(T3-T2)+(T4-T3)=(T4-T1)=td+\text{SIFS}+td \quad (1)$$

$$\text{Hence, } td=(T4-T1-\text{SIFS})/2 \quad (2)$$

Expression (2) is a simplified equation that is included so as to provide the basic idea of the ranging transmission method. Note that the duration of the transmitted packet and the response packet is not accounted for in equation (2). Note that in practice it is common that the timestamp of a packet is set to coincide with the end of the packet at the point where the frame check is completed.

Figure 4:
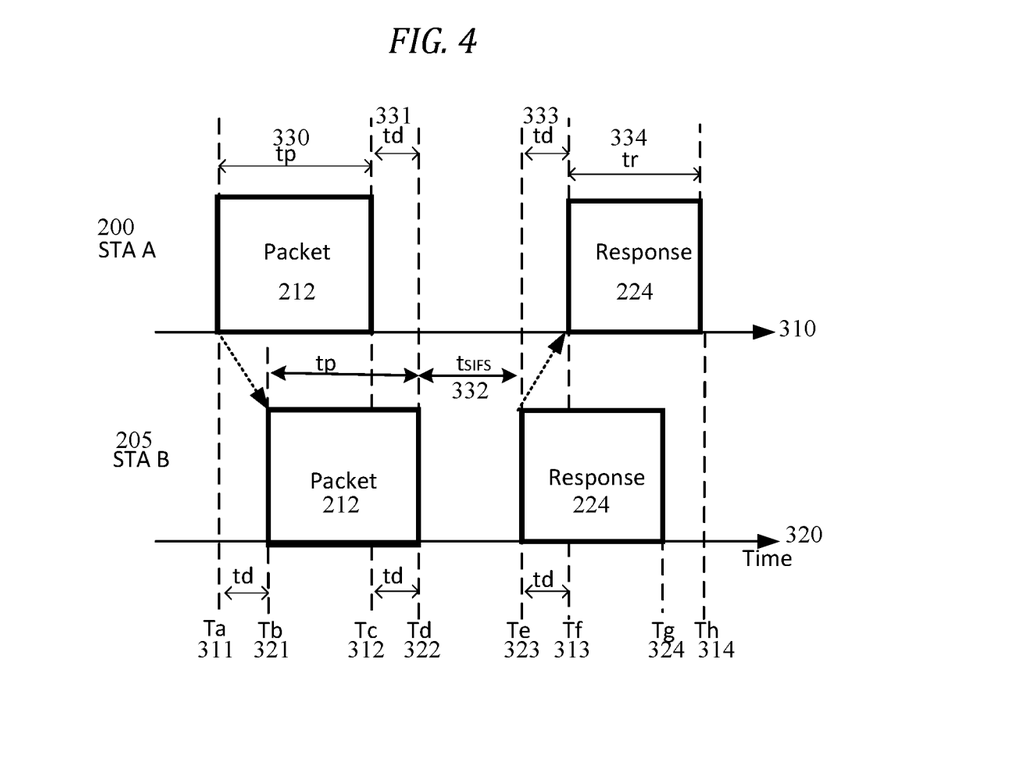
FIG. 4 is a timing diagram that describes in further detail the ranging transmission method.

FIG. 4 is a timing diagram that describes in further detail the ranging transmission method. Time axis 310 is the time axis for STA A 200 and time axis 320 is the time axis for STA B 205. At time Ta 311, STA A 200 starts the transmission of packet 212 which is addressed to STA B 205. After a time delay of td, at time Tb 321, STA B 205 starts to receive packet 212. At time Tc 312, STA A 200 completes the transmission of packet 212 and at time Td 322, STA B 205 completes the reception of packet 212. The time difference between Tc 312 and Td 322 is td, the propagation time for the packet to travel from STA A 200 to STA B 205. Note that the time differences (Tc−Ta) and (Td−Tb) are both the duration tp 330 of the transmitted packet 212.

STA B 205 transmits the response packet 224 at time Te 323. Assuming that the response packet 224 is an ACK or an RTS packet in reply to the received packet 212, time Te 323 may be at a time $t_{SIFS}$ 332 after time Td 322, where $t_{SIFS}$ 332 is the SIFS time as defined in the IEEE 802.11 standard. At time Tf 313, STA A 200 starts to receive the response packet 224. At time Tg 324, STA B 205 completes the transmission of the response packet 224 and at time Th 314, STA A 200 completes receiving the response packet 224. Note that the time differences (Tb−Ta), (Td−Tc), (Tf−Te) and (Th−Tg) are all equal and have the value td which is the propagation time for the packet and response to travel between the two STAs.

At STA A 200, the time of a packet at the point when the frame check has completed, may be recorded. Hence, if STA A 200, is the measuring station, the time for the transmission of packet 212 that is recorded is Tc 312, and the time that is recorded for the reception of the response 224 is Th 314. In order to calculate the value of td, it is necessary to know the duration tr 334 of the response 224. Calculating the duration tr 334 is straightforward as the measuring station STA A 200 can monitor the details of the response packet such as data rate and length. In practice therefore, STA A 200 can calculate the value of td from expression (3):

$$td=(Th-Td-tr-t\text{SIFS})/2 \quad (3)$$

and hence the corresponding distance, $$D = td*c \quad (4)$$

Stated another way, STA A 200 begins transmission of ranging packet 212 at a beginning transmission time Ta 311 and ends transmission of the ranging packet 212 at an ending transmission time Tc 312. STA B 205 begins receiving of the first ranging packet 212 at a beginning reception time Tb 321 and receives the complete first ranging packet 212 at an ending reception time Td 322, wherein d is measured as the time between the ending transmission time Tc 312 and the ending reception time Td 322.

In the case that there is a single measuring station 110, as may be the case when the station is airborne, then the three measuring distances D1 130, D2 140 and D3 150 will be taken at different points in time. In this case the airborne measuring station 110 may be flying over an area and periodically transmitting the packets 212, receiving the response packets 224 and calculating the delay time td. Over time the location of target station 120 can be calculated with increasing accuracy as more measurements are taken by the airborne measuring station 110 from varying positions. Such calculations are well known in the art.

As mentioned previously, the packet exchange may be any pair of packets where an automatic response packet is sent. Commonly used packets in Wi-Fi include an RTS/CTS exchange and a Data (null)/Ack exchange. In one embodiment of the present disclosure, a single airborne measuring station 110 is used.

A method and devices are disclosed that increase the range of active geo-location from the airborne measuring station 110 as compared with prior methods and systems by increasing the effective receive sensitivity of the airborne measuring station 110. In some embodiments, the disclosed method applies to the reception of direct sequence spread spectrum DSSS ACK and CTS packets in response to data null and RTS packets respectively, in the 2.4 GHz band.

In one non-limiting embodiment used to describe some of the functions and concepts herein, a DSSS CTS and a DSSS ACK packet consist of 304 bits:
- 128 scrambled 1s;
- 16 bit SFD (start of frame delimiter);
- 48 bit header; and
- 14 Bytes payload;
  - 2 Byte Frame Control;
  - 2 Byte Duration field;
  - 6 byte Receiver Address (RA); and
  - 4 Byte Frame Check Sum (FCS).

A 1 Mbps DSSS packet uses an 11 bit Barker code to spread the signal. Each bit is represented by the 11 bit code either as is, for a 1, or inverted for a 0. Hence there is a processing gain (PG) of approximately 10 dB (PG=10 log 11). The modulation is binary phase shift keying (BPSK).

The probability of a bit error, Pb, for BPSK, is $$Pb = 0.5 \, \text{erfc} \, \sqrt{E_b/N_0} \quad (6)$$

where "erfc" is the Gauss complimentary error function
$E_b$ is energy per bit
$N_0$ is noise per hertz
For BPSK, $E_b/N_0$ is equal to the signal to noise ratio, SNR. The packet error rate (PER) is related to the bit error, Pb by the expression $$PER = 1 - (1 - Pb)^N, \quad (7)$$

where N is the number of bits in the packet
For a packet error rate PER=0.7, with N=304, from equations (6) and (7), Pb=0.00386 and Eb/No=SNR=5.5 dB.

With the 10 dB processing gain (11 bit Barker code), this is equivalent to an input SNR=−4.5 dB. The received signal level is calculated using the standard formula:

$$Pr = 10 \log(1000K \, T) + 10 \log BW + NF + SNR \text{ dBm} \quad (8)$$

Where K is Boltzmann's constant
T is temperature in degrees Kelvin
BW is the occupied bandwidth, Hz
NF is the noise figure, dB
For T=20° Celsius, 10 log (1000 K T)=−174 dBm
BW=20 MHz for DSSS and assuming NF=3 dB and SNR=−4.5 dB, from (8)

$$Pr = -102.5 \text{ dBm}.$$

A receiver sensitivity of −102.5 dBm for a 70% PER represents a situation with no implementation losses.

Now, for example, consider a signal 10 dB lower, i.e., Pr=−112.5 dBm. In this case the input SNR=−14.5 dB but, after 10 dB processing gain, the effective SNR is −4.5 dB. From equation (6) the bit error Pb=0.2. Hence, 80% of the detected bits are correct, or, of the 304 bits in the CTS or ACK packet, 243 bits are correct. Note that the PER, from equation (7) is 100% and the detected packet would fail the FCS and hence normally the packet would be discarded.

If, as per this example of Pb=0.2, 243 bits of the total 304 bits of the expected CTS or ACK are correct then it might quite safely be assumed that the packet was indeed the CTS or ACK that was expected. Hence, if all the bits of the CTS or ACK are known in advance, then the received bits may be compared to the expected bits and a decision taken as to whether the CTS or ACK had indeed been received. This technique is known as correlation where the decision is based upon a correlation threshold.

In the general sense, correlation works by passing the known pattern across the noisy pattern, and if the bits agree, they add, if not the bits subtract.
For a packet of N bits, N.Pb bits will not match and N (1-Pb) will match, Hence Correlation %=100(Match−Mismatch)/Total or Correlation %=100(N−2N Pb)/N=100(1−2Pb)  (9)

Hence, for Pb=0.2, Correlation %=100(1−2×0.2)
=60%

Note that for pure noise, Pb=0.5 and hence 152 bits will agree (match), 152 will not agree (mismatch) and correlation will be 0%.

If the raw detected 304 bits of the DSSS CTS or DSSS ACK packets are correlated across the known bits of the complete packet, then it is possible to detect a CTS or ACK packet that is well below the noise level.

For a given SNR, the bit error Pb may be calculated using equation (6) and the correlation % calculated using equation (9). Assuming a binomial distribution, the variance and standard deviation σ for the correlation % may be calculated:

$$\sigma^2 = N \, Pb(1-Pb)$$

$$\sigma = \sqrt{NPb(1-Pb)} \quad (10)$$

Figure 5:
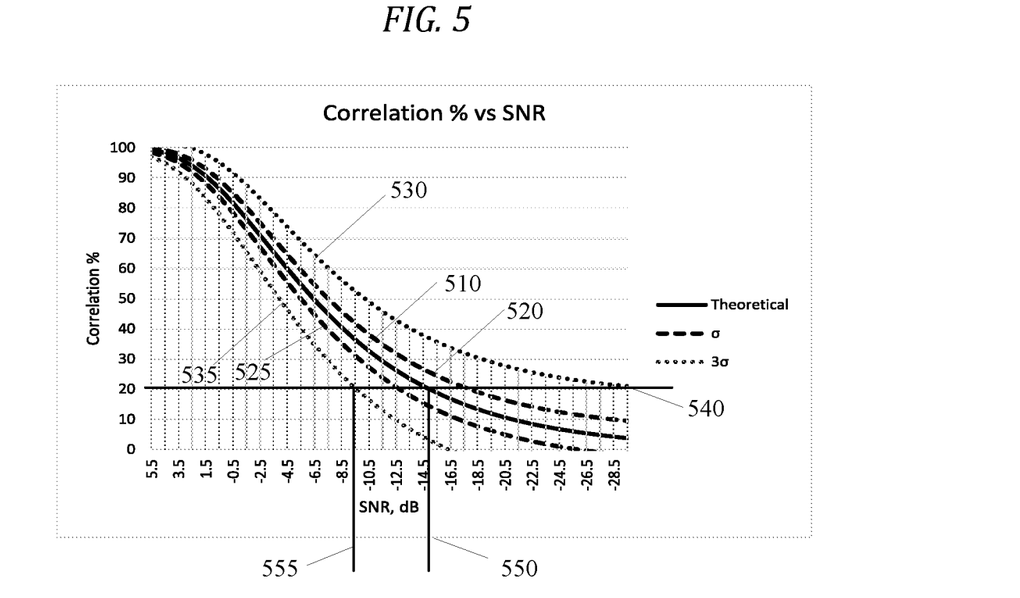
FIG. 5 is a graph of Correlation % versus SNR for 304 bits.

FIG. 5 is a graph of Correlation % versus SNR for 304 bits. The theoretical correlation 510 is calculated using equation (9). Also plotted are the standard deviations, +σ and −σ, 520 and 525 respectively. There is a 0.3% probability that the result is within the range+3σ and −3σ, and these values are plotted in curves 530 and 535 respectively. For SNR=−29 dB and less, the input is close to pure noise. From the 3σ curve 530, for SNR=−29 dB, the correlation is in the order of 20% 540. Hence, there is a 0.3% probability that noise will result in a correlation of 20%. Or, if the correlation threshold is set at 20% there is a 99.7% probability that the CTS or ACK will be correctly detected. From the −3σ curve 535 this corresponds to an SNR of about −9.5 dB 555. Hence, theoretically, selecting a correlation threshold of 20% should result in greater than 97.7% detection of packets of 304 bits.

Figure 6:
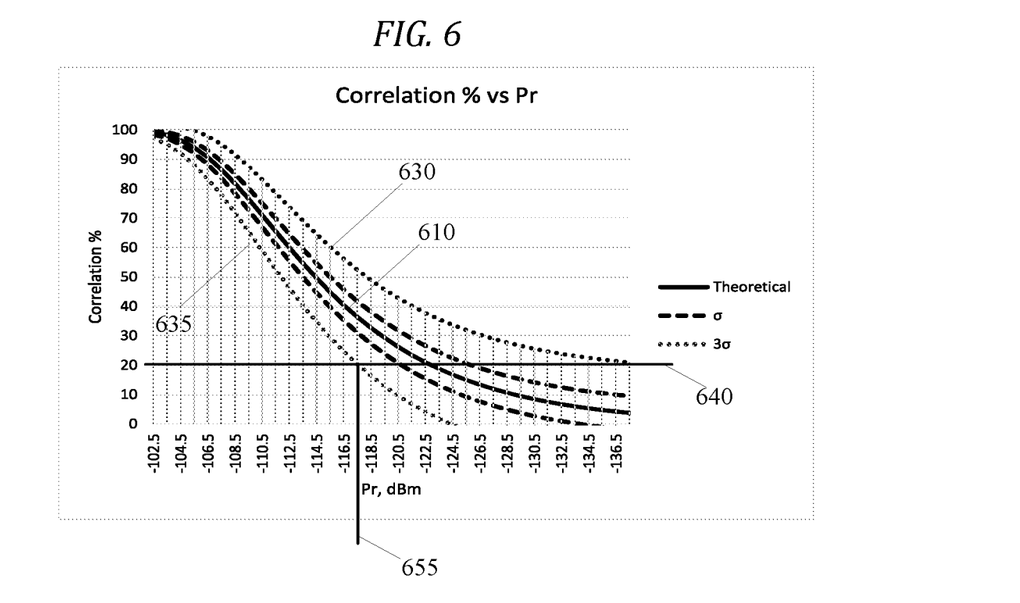
FIG. 6 is a graph of Correlation % versus received signal power Pr for 304 bits.

FIG. 6 is a graph of Correlation % versus received signal power Pr for 304 bits. FIG. 6 is similar to FIG. 5 but the received signal strength Pr, as calculated using equation (8) assuming a noise figure of 3 dB, is shown as the horizontal axis in place of SNR. The theoretical correlation 510 is calculated using equation (9). There is a 0.3% probability that the result is within the range+3σ and −3σ, and these values are plotted 630 and 635 respectively. For receive signal levels less than −137 dBm, there is a 0.3% probability that noise will result in a correlation of 20%, 640. 20% correlation 640 relates to a signal level of about −117.5 dBm, 655. Hence, theoretically, selecting a correlation threshold of between 20% and 30% should result in greater than 97.7% detection of packets of 304 bits, which corresponds to an input signal level in the order of −117 dBm.

In order for the correlation to be effective the complete raw bit stream of the response packet 224 should be known. In the cases where this response packet 224 is either a DSSS CTS or a DSSS ACK then the packet may comprise 304 bits.

Figure 7:
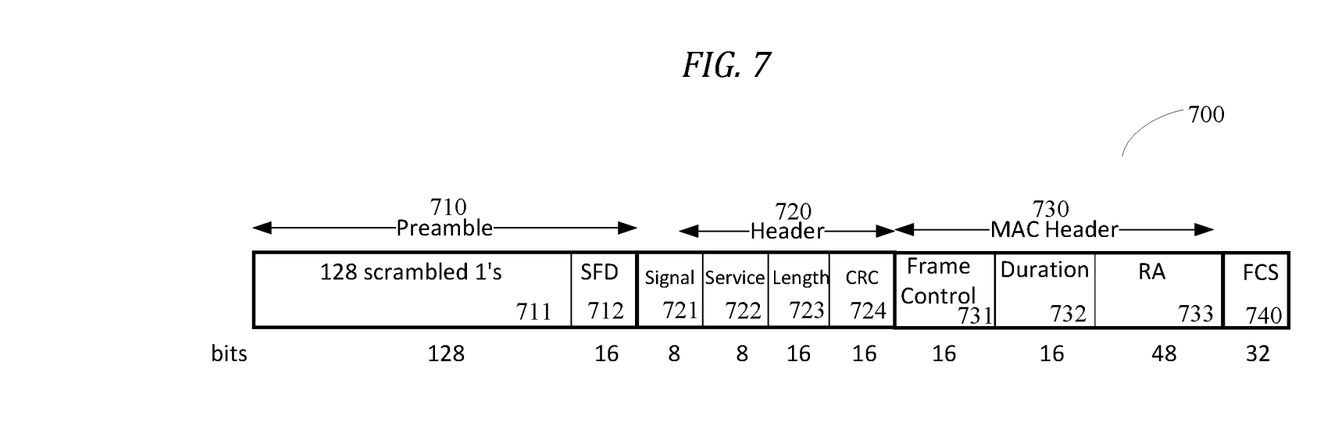
FIG. 7 is a diagram of the frame format of a 1 Mbps DSSS CTS or DSSS ACK.

FIG. 7 is a diagram of the frame format 700 of a 1 Mbps DSSS CTS or DSSS ACK. The packet starts with the Preamble 710 which comprises 128 scrambled 1's 711 and a start of frame delimiter SFD field 712. The Preamble 710 is followed by the Header 720 which comprises four fields: Signal 721, Service 722, Length 723 and CRC 724. The Header 720 is followed by the MAC Header 730 which comprises three fields: Frame Control 731, Duration 732 and receiver address (RA) 733. The packet ends with the frame check sum (FCS) 740.

Figure 8:
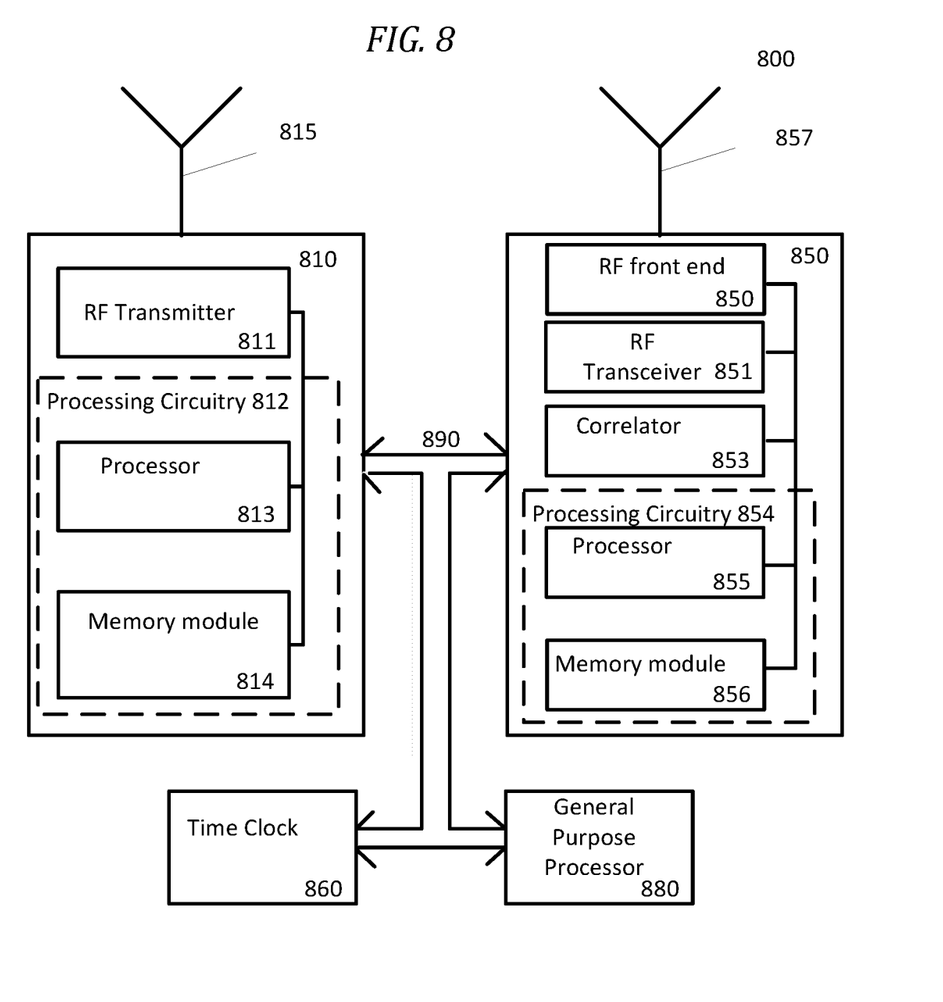
FIG. 8 illustrates a wireless communication device which according to an embodiment of the disclosure may be used as the airborne measuring station.

FIG. 8 illustrates a block diagram of an example wireless communication device 800 which, according to an embodiment of the disclosure, may be used as or as part of the airborne measuring station 110. The wireless communication device 800 may be a measuring station and may be referred to herein as measuring station 800.

The wireless communication device 800 may be any device capable of wirelessly receiving signals and transmitting signals and may be configured to execute any of the methods of the IEEE 802.11-2016 Standard. Wireless communication device 800 may be one or more stations or access points, and the like. Wireless communication device 800 may be one or more wireless devices that are based upon the IEEE 802.11 specification and each may be configured to act as a transmitter or a receiver. The example and non-limiting embodiment described herein is that where wireless communication device 800 includes a transmitter station 810 and a receiver station 850. The wireless communication device 800 may also include a time clock 860 and a general purpose processor 880 which are interconnected to the two stations 810 and 850 by a data bus 890.

In some embodiments, the transmitter station 810 includes an RF transmitter 811 and processing circuitry 812 that includes processor 813, and memory module 814. The transmitter station 810 also includes one or more wireless antennas such as wireless antennas 815. The RF transmitter 811 may perform the functions of spreading, and DSSS modulation, as described in IEEE 802.11-2106, and amplification for the transmission of the DSSS packets via the antenna 815. In some embodiments the processing circuitry 812 and/or the processor 813 may comprise integrated circuitry for processing and/or control, e.g., one or more processors and/or processor cores and/or FPGAs (Field Programmable Gate Array) and/or ASICs (Application Specific Integrated Circuitry) configured to execute programmatic software instructions. In some embodiments the functions of the RF transmitter 811 may be performed by the processing circuitry 812. The processing circuitry 812 may be configured to control any of the methods and/or processes described herein and/or to cause such methods, and/or processes to be performed, e.g., by the wireless transmitter 811. The memory module 814 may be configured to store data, programmatic software code and/or other information described herein. In some embodiments, the software may include instructions that, when executed by the processing circuitry 812, causes the processing circuitry 812 to perform the processes described herein with respect to the wireless transmitter 810.

In some embodiments, the receiver station 850 includes an RF front end 850, an RF receiver 852, a correlator 843, processing circuitry 854 (that includes a processor 855 and a memory module 856) and one or more wireless antennas such as wireless antenna 857. The RF front end 850 may perform the usual functions of an RF receiver front end such as low noise amplification, filtering and frequency down conversion so as to condition the received signal suitable for inputting to the RF receiver 852. The RF receiver 852 may perform the functions of demodulation and de-spreading of the DSSS packet so as to condition the received signal suitable for inputting to the correlator 853. The correlator 853 performs the function of correlating the conditioned, demodulated received bits with the known bit pattern. In some embodiments the RF receiver 852 and/or the correlator 853 and/or the processing circuitry 854 may comprise integrated circuitry for processing and/or control, e.g., one or more processors and/or processor cores and/or FPGAs (Field Programmable Gate Array) and/or ASICs (Application Specific Integrated Circuitry) configured to execute programmatic software instructions. In some embodiments the functions of the RF receiver 852 and/or the correlator 853 may be performed by the processing circuitry 854. The processing circuitry 854 may be configured to control any of the methods and/or processes described herein and/or to cause such methods, and/or processes to be performed, e.g., by the wireless receiver 850. The memory module 856 is configured to store data, programmatic software code and/or other information described herein. In some embodiments, the software may include instructions that, when executed by the processing circuitry 854, causes the processing circuitry 854 to perform the processes described herein with respect to the wireless receiver 850.

According to this embodiment of the disclosure the wireless receiver 850 may be configured to measure and monitor an input signal's attribute, such as may include one or more of a ranging signal transmitted by wireless transmitter 810, data and control packets, and the response signal, including control packets, transmitted by an access point or station that may be based upon the IEEE 802.11-2016 Standard. Such packets may include data null, ACK, RTS and CTS packets. The memory module 856 may store instructions for executing any method mentioned in the IEEE 802.11-2016 Standard, input signals, and results of processing of the processor 855, signals to be outputted and the like.

According to an embodiment of the disclosure the RF transmitter 811 may be configured to transmit signals and the processing circuitry 812 may be configured to prepare the transmitted signal attributes based upon the IEEE 802.11-2016 Standard. Such transmitted packets may include data packets, control packets and management packets that are to be transmitted by a wireless station that is based upon the IEEE 802.11. Such control packets may include RTS packets. The memory module 814 may store instructions for executing any method mentioned in the specification, input signals, and results of processing of the processor 813, signals to be outputted and the like.

According to another embodiment of the disclosure, the wireless receiver 850 may be configured to receive the transmissions of another wireless communication device 120 and the processing circuitry 854 may be configured to monitor an attribute of the transmissions of the other wireless communication device, and determine the value of the time of arrival of packets from the other wireless communication device. In addition, according to an embodiment of the disclosure the wireless receiver 850 may be configured to measure the times of departure of the transmissions from the wireless transmitter 810. These times may be accomplished by outputting a trigger that is timed to coincide with the reception packet from the other wireless device 120 or the wireless transmitter 810. This trigger may then be used to read the time from the time clock 860. Time clock 860 may have a precision that is higher than the internal TSF timer that is part of the wireless receiver 850.

According to an embodiment of the disclosure the wireless transmitter 810 may be configured to transmit packets to another wireless communication device and the processor 813 may be configured to prepare the attributes of the packet to be transmitted.

According to an embodiment of the disclosure, a general purpose processor 880 may be used to control the operations of the wireless communication device 800, e.g., a measuring station, and in particular the wireless transmitter 810 and wireless receiver 850. The general purpose processor 880 may also carry out the various calculations as described in this disclosure and may also prepare the measurement results for disclosure to an operator or user. In some embodiments, the general purpose processor 880 can be computing device such as a tablet computer, desktop computer, laptop computer or distributed computing, e.g., cloud computing. In some embodiments, the general purpose processor 880 can be a processor/CPU in the tablet, laptop computer, desktop computer or distributed computing environment, etc. In some embodiments the general purpose processor 880 may comprise integrated circuitry for processing and/or control, e.g., one or more processors and/or processor cores and/or FPGAs (Field Programmable Gate Array) and/or ASICs (Application Specific Integrated Circuitry) configured to execute programmatic software instructions and may include a memory module to execute programmatic code stored in the general purpose processor or another device. It is also noted that the elements of the wireless communication device 800 can be included in a single physical device/housing or can be distributed among several different physical devices/housings.

Figure 9:
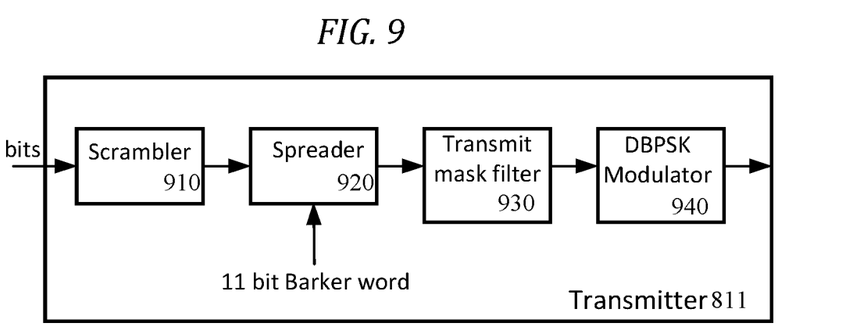
FIG. 9 is a block schematic diagram of a DSSS transmitter.

FIG. 9 is a functional block diagram of an example of a DSSS RF transmitter 811. The bits to be transmitted, as described in FIG. 7, are first past through a scrambler 910. All information bits are scrambled using a self-synchronizing 7-bit polynomial $G(z)=z^{-7}+z^{-4}+1$. The IEEE 802.11—2016 Standard allows for a random seed for the DSSS physical layer, Clause 15, but for the High Rate DSSS (HR/DSSS) physical layer, Clause 16, a fixed seed is defined. In practice the fixed seed is used by the vast majority of devices for both DSSS and HR/DSSS. The scrambled bits are then passed to the spreader block 820 where the bits are spread with the 11 bit Barker code. The resulting spread spectrum signal is then filtered by a transmit mask filter 930 and then modulated DBPSK by the modulator block 940.

Assuming that the scrambler seed is known, then all the raw scrambled bits in the CTS or ACK packet are known. The Preamble 710 and Header 720 bits are common for all CTS and ACK packets, and the Frame Control 731 bits will also be common for each CTS or ACK packet. The Duration field 732 is based upon the Duration field of the transmitted ranging packet 212 and hence can be set to a unique value. Also, the RA field 733 is set to the transmitter address (TA) field of the transmitted ranging packet 212 and hence will also be unique. The FCS field 740 will therefore be unique due to the uniqueness of the Duration and RA fields. Hence, of the 304 bits, up to 96 bits will be unique. A spurious received packet would therefore have 96 incorrect bits, equivalent to a correlation % of only 36%. The correlation is taken across the complete packet of 304 bits and if the correlation % threshold is crossed then there is a high confidence that the received packet was indeed the expected packet.

Figure 10:
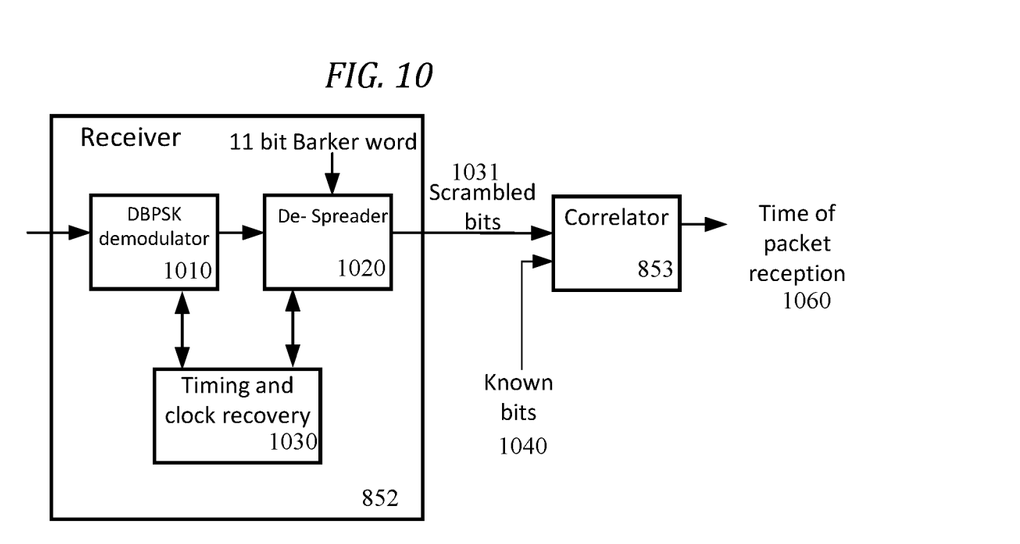
FIG. 10 is a block schematic diagram of a DSSS receiver according to one example of this disclosure.

FIG. 10 is a functional block diagram of an example of an RF receiver 852 and correlator 853, according to one example of this disclosure. The received DSSS signal is demodulated and de-spread with the 11-bit Barker code in blocks 1010 and 1020 respectively. A timing and recovery block 1030 may be used to aid in this process. In cases where the response packet is below the noise level, the output 1031 of the de-spreader 1020 may include the raw, scrambled bits that may or may not contain the expected response packet. These raw bits may be inputted to a correlator block 853 where they are correlated with the known bit pattern 1040. If a correlation above a set correlation threshold is found, then the time 1060 of the packet reception is outputted.

Figure 11:
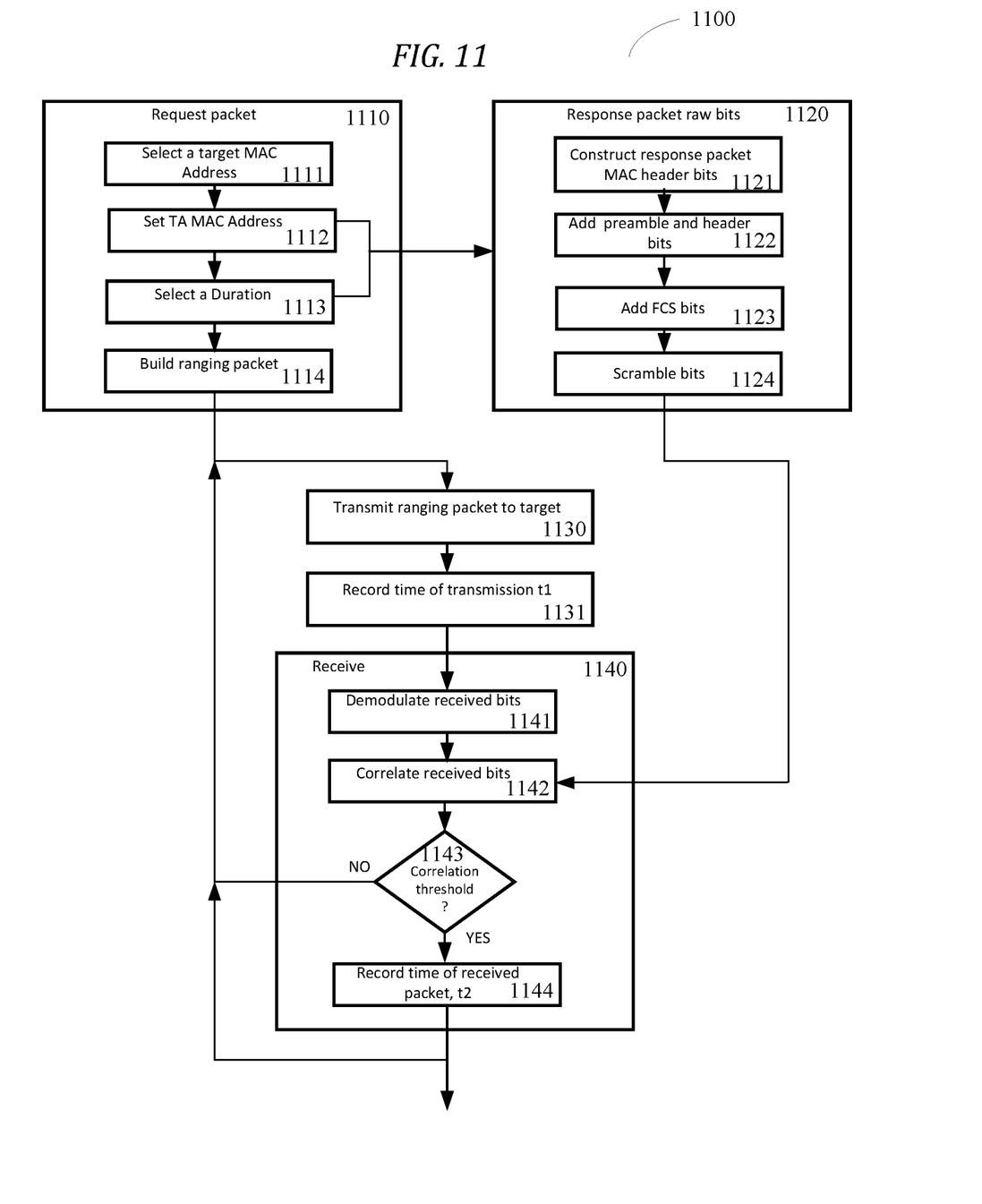
FIG. 11 is a flow diagram of an example of one embodiment of the of the geo-location process as described in FIGS. 3 and 4, utilizing the example wireless communication device which according to an embodiment of the disclosure may be used as or as part of the airborne measuring station.

FIG. 11 is a flow diagram 1000 of an example of one embodiment of the of the geo-location process as described in FIGS. 3 and 4, utilizing the example wireless communication device 800 which according to an embodiment of the disclosure may be used as or as part of the airborne measuring station 110. The process may start with step 1110 where the ranging packet 212 is built. Step 1110 may be performed by the processor 813 in the wireless transmitter 810.

Step 1110 may include step 1111 where the MAC address of the target station 120 is selected. Step 1110 may include and step 1111 may be followed by step 1112 where the MAC address to be used in the ranging packet 212 is set. In the ranging packet 212, which may be an RTS or a data null, this MAC address may be the TA Address. In the corresponding response packet 224, this MAC address may be the RA 733. Step 1110 may include and step 1112 may be followed by step 1113 where a duration value is selected for the MAC header of the ranging packet 212. This effectively sets the value of the duration field 732 expected in the response packet 224. The value of the duration field 732 in the response packet 224 may be equal to the value of the duration field in the ranging packet 212 minus SIFS minus the length of the response packet 224. Hence by setting a known specific value in the duration field a unique value for the duration field 732 in the response packet 224 is set. Step 1110 may include and step 1113 may be followed by step 1114 where the MAC header and payload for the ranging packet 212 is constructed. Step 1110 may be followed by step 1130 where the ranging packet 212 may be transmitted. Step 1130 may include taking the MAC Header and payload constructed in step 1014, adding the preamble and header, and then scrambling, spreading and modulating the bits as performed by the RF transmitter 811 described in FIG. 9. Step 1130 may be followed by step 1131 where the time t1 of transmission of the ranging packet 212 is recorded. Step 1131 may be performed by wireless receiver 850.

The values for the MAC address in step 1112 and the duration in step 1113 may be inputted to Step 1120 where the expected raw bits for the response packet 224 are determined. This transfer of information may be between processor 813 and processor 855 across data bus 890. Step 1120 may include and start with step 1121 where the MAC header 730 for the response packet 212 is determined including the MAC address set in step 1112 as the RA 733, and duration field value 732 based upon the duration field value set in step 1113 minus SIFS minus the length of the response packet. The length of a CTS or ACK packet at 1 Mbps is 304 μs, and SIFS is 10 μs, so the expected value for the duration field 732 is a value less than the duration set in step 1013. The determination of the MAC address and duration field may be performed by the processor 813. Step 1120 may include and step 1121 may be followed by step 1122 where the preamble and header bits are added to the MAC header bits constructed in step 1121. Step 1120 may include and step 1122 may be followed by step 1122 where the FCS bits 740 are calculated for the expected response packet 224. Step 1120 may include and step 1123 may be followed by step 1124 where the complete response packet bits, constructed in steps 1121, 1122, and 1123 are scrambled assuming the fixed seed specified for HR/DSSS in IEEE 802.11-2016. The output from step 1120 is the bit stream representing the expected, scrambled, raw bit stream of the response packet 224.

Step 1131 may be followed by step 1140 where it is determined if a response packet 224 has been received. Step 1140 may include and start with step 1141 where the incoming received signal is demodulated and de-spread resulting in the raw scrambled bits 930, as described above with respect to FIG. 10. Step 1141 may be performed by the RF receiver 852. Step 1140 may include and step 1141 may be followed by step 1142 where the raw scrambled bits 930 may be correlated against the expected raw bit stream obtained from step 1020, as explained above with respect to FIG. 10. Step 1140 may include and step 1142 may be followed by step 1143 where it is determined if the correlation threshold resulting from the correlation process performed in step 1142 and as discussed above with reference to FIGS. 5 and 6, has been exceeded, indicating that it is probable that the expected response packet 224 has indeed been received. Steps 1142 and 1143 may be performed by the correlator 853. If it is determined that the threshold has been exceeded, then step 1140 may include and step 1143 may be followed by step 1144 where the time t2 of the received packet is recorded. Step 1144 may be performed by processing circuitry 854 or general purpose processor 880. The calculation of the distance from the airborne measuring station 110 to the target station 120 is as described in equations (2) and (4) where t1=T1 and t2=T4. The process may then return to step 1130 where another ranging packet 212 is transmitted or may terminate and restart at step 1110 for a different target station 120. Step 1143 may include a timeout such that if the correlation threshold has not been exceeded in a certain time then it is determined that the correlation threshold has not been exceeded and the process may then return to step 1130 where another ranging packet 212 is transmitted, or may terminate and restart at step 1110 for a different target station 120.

Figure 12:
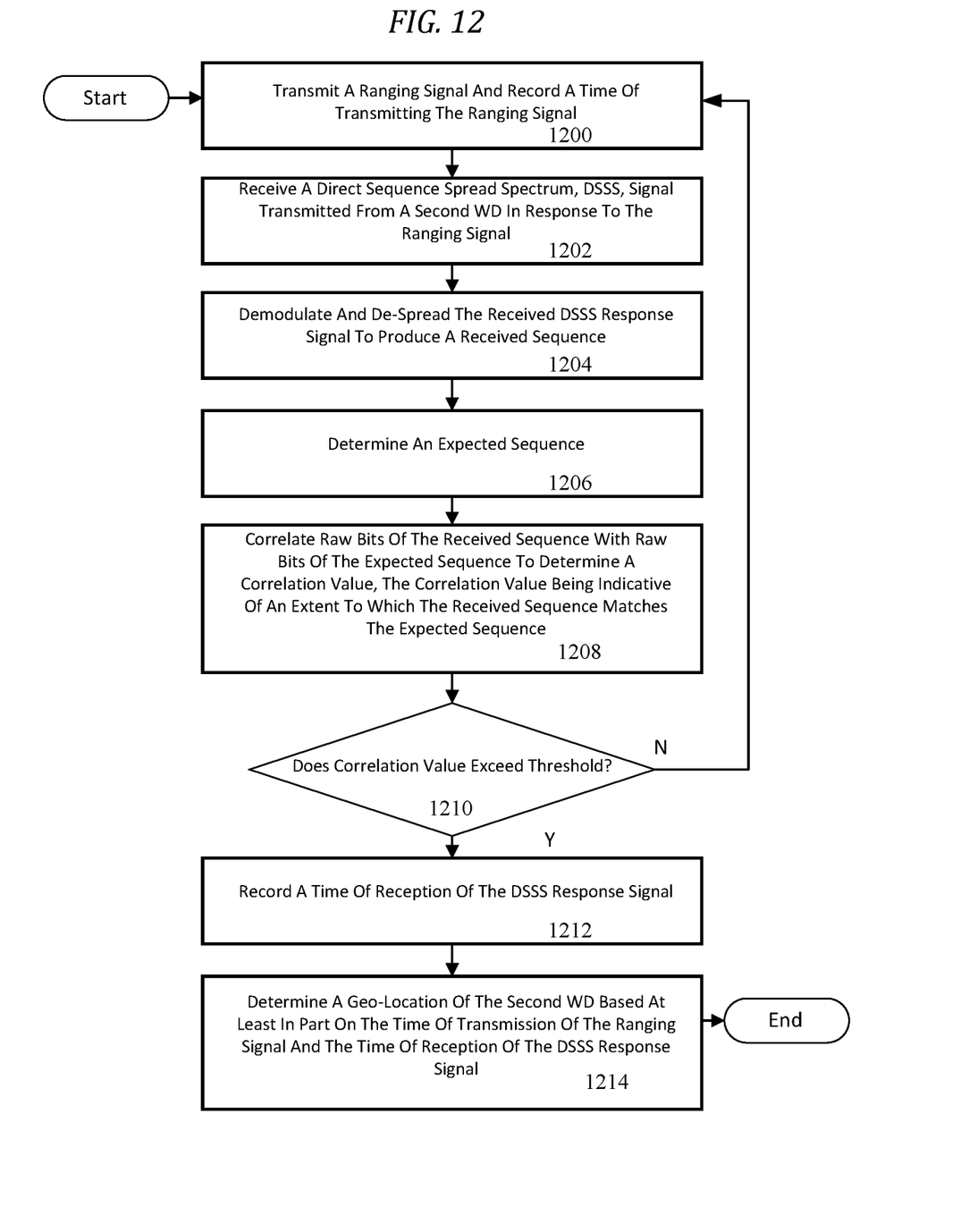
FIG. 12 is a flowchart of an exemplary process for determining a WD geo-location with improved receiver sensitivity.

FIG. 12 is a flowchart of an exemplary process for determining at a first wireless device, such as an airborne station, a geo-location of a second wireless device, such as a mobile ground station. The process includes transmitting, via the transceiver 851 (which may include transmitter 811 and receiver 852), a ranging signal and recording a time of transmitting the ranging signal (step 1200). The process further includes receiving, via the transceiver 851, a direct sequence spread spectrum, DSSS, signal transmitted from a second WD in response to the ranging signal (step 1202). The process further includes demodulating, via DBPSK demodulator 1010 and de-spreading, via de-spreader 1020, the received DSSS response signal to produce a received sequence (step 1204). Also, an expected sequence is determined (step S1206). The raw bits of the received sequence are correlated, via the correlator 853, with the raw bits of the expected sequence to determine a correlation value indicative of an extent to which the received sequence matches the expected sequence (step 1208). The correlation value is compared, via processing circuitry 854, to a predetermined threshold, T, (step 1210). When the correlation value exceeds the threshold, T, then the process includes recording, via processing circuitry 854, a time of reception of the received DSSS response signal (step 1212) and determining, via the processing circuitry 854 a geo-location of the second WD based at least in part on the time of transmission of the ranging signal and the time of reception of the DSSS response signal (step 1214).

Thus, according to one aspect, a method for improving the sensitivity of a determination of the geo-location of the second wireless device 810 is provided by correlating, via correlator 853, of raw bits of a received sequence with a raw bits of an expected sequence to achieve a significant processing gain over known methods. The method includes transmitting, via the transceiver 851, a ranging signal and recording a time of transmitting the ranging signal; The method further includes receiving, via the transceiver 851, a direct sequence spread spectrum, DSSS, signal transmitted from a second WD 810 in response to the ranging signal. The received DSSS signal is demodulated and de-spread via transceiver 851 and processing circuitry 854 to produce a received sequence. An expected sequence is also determined. The method includes correlating, via the correlator 853, raw bits of the received sequence with raw bits of the expected sequence to determine a correlation value, the correlation value being indicative of an extent to which the received sequence matches the expected sequence. The process also includes comparing, via the processing circuitry 854, the correlation value to a predetermined threshold, T. When the correlation value exceeds the threshold, T, then the time of reception of the received DSSS response signal is recorded, and a geo-location of the second WD is determined, via the processing circuitry 854, based at least in part on the time of transmission of the ranging signal and the time of reception of the DSSS response signal.

According to this aspect, in some embodiments, the transmitted ranging signal is one of a return-to-send, RTS, signal and a data null signal. In some embodiments, the method further includes determining, via the processing circuitry 854, parameters of the ranging signal by one of selecting a WD receiver address, RA, to be used as a medium access control, MAC, address of the second WD, selecting a MAC address to be used as a wireless transmitter address, TA, and selecting a duration value. In some embodiments, the determination of the raw bits of the expected sequence includes: constructing, via the processing circuitry 854, the medium access control, MAC, header bits based on using a transmitter address, TA, of the ranging signal as a receiver address, RA, of the DSSS response signal; add preamble and header bits to the MAC header bits to produce a packet; and scramble the packet using a predetermined seed to produce the raw bits of the expected sequence. In some embodiments, a likelihood of correctly determining that a valid ranging signal has been received is greater when the determination is based on correlation than when the determination is based on a frame checksum. In some embodiments, the method further includes determining, via the processing circuitry 854, a time associated with the received sequence when a valid ranging signal has been received. In some embodiments, the threshold, T, depends at least in part on a bit error probability, Pb, the bit error probability, Pb, being based on a signal to noise ratio (SNR). In some embodiments, the threshold, T, in percent is given by T=100 (1-2 Pb). In some embodiments, the expected sequence includes a 304 bit sequence that includes up to 96 unique bits and at least one field of variable bits. In some embodiments, the method further includes receiving a subsequent spread spectrum signal when the threshold, T, is not exceeded for a predetermined time.

According to another aspect, a first wireless device (WD) includes a transceiver 851 configured to transmit a ranging signal and to receive a direct sequence spread spectrum, DSSS, signal from a second WD in response to the ranging signal. The first WD also includes processing circuitry 854 in communication with the transceiver 851. The processing circuitry 854 is configured to de-spread the received DSSS signal to produce a received sequence; and determine an expected sequence. A correlator 853 in communication with the processing circuitry 854 is configured to: correlate raw bits of the received sequence with raw bits of the expected sequence to determine a correlation value, the correlation value being indicative of an extent to which the received sequence matches the expected sequence. The processing circuitry 854 is further configured to: compare the correlation value to a predetermined threshold, T, and when the correlation value exceeds the threshold, T, then: record a time of reception of the received DSSS response signal and determine a geo-location of the second WD based at least in part on a time of transmission of the ranging signal and the time of reception of the DSSS response signal.

According to this aspect, in some embodiments, the transmitted ranging signal is one of a return-to-send, RTS, signal and a data null signal. In some embodiments, the processing circuitry 854 is further configured to determine parameters of the ranging signal by one of selecting a WD receiver address, RA, to be used as a medium access control, MAC, address of the second WD, selecting a MAC address to be used as a wireless transmitter address, TA, and selecting a duration value. In some embodiments, the determination of the raw bits of the expected sequence includes: constructing, via the processing circuitry 854, the medium access control, MAC, header bits based on using a transmitter address, TA, of the ranging signal as a receiver address, RA, of the DSSS response signal; add preamble and header bits to the MAC header bits to produce a packet; and scramble the packet using a predetermined seed to produce the raw bits of the expected sequence. In some embodiments, a likelihood of correctly determining that a valid ranging signal has been received is greater when the determination is based on correlation than when the determination is based on a frame checksum. In some embodiments, the processing circuitry 854 is further configured to determine a time associated with the received sequence when a valid ranging signal has been received. In some embodiments, the threshold, T, depends at least in part on a bit error probability, Pb, the bit error probability, Pb, being based on a signal to noise ratio (SNR). In some embodiments, the threshold, T, in percent is given by T=100 (1-2 Pb). In some embodiments, the expected sequence includes a 304 bit sequence that includes up to 96 unique bits and at least one field of variable bits. In some embodiments, the transceiver 851 is further configured to receive a subsequent spread spectrum signal when the threshold, T, is not exceeded for a predetermined time.

According to yet another embodiment, an airborne station 110 has a transceiver 851 and processing circuitry 854 configured to increase the range of locating a wireless device 810 is provided. The transceiver 851 is configured to: transmit a ranging signal, the ranging signal being one of a return-to-send, RTS, signal and a data null signal; and receive a direct sequence spread spectrum, DSSS, signal from a ground station, the signal being spread by an 11 bit barker code. The processing circuitry 854 is configured to: de-spread the received DSSS signal to produce a received sequence, the received sequence having one of a Clear To Send (CTS) signal and an acknowledgement (ACK) signal and obtain an expected sequence. The processing circuitry 854 is further configured to correlate the received sequence with the expected sequence to determine a correlation value, the correlation value being indicative of an extent to which the received sequence matches the expected sequence. The process performed by the processing circuitry 854 also includes comparing the correlation value to a threshold, T, the threshold, T, being based on a bit error probability, which in turn is based on a signal to noise ratio (SNR). When the correlation value exceeds the threshold, T, the processing circuitry is further configured to determine a time associated with the received sequence and determine a range of the WD based on the time associated with the received sequence.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD ROMs, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

While the above description contains many specifics, these should not be construed as limitations on the scope, but rather as an exemplification of several embodiments thereof. Many other variants are possible including, for examples: the correlation threshold value(s), the duration field value(s), the MAC address used in the ranging packet, the timing of the ranging packets, the timeout used for a response packet, and the details of the de-spreader and demodulator. Accordingly, the scope should be determined not by the embodiments illustrated.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method in a first wireless device (WD), the method comprising:
    transmitting a ranging signal and recording a time of transmitting the ranging signal; receiving a direct sequence spread spectrum, DSSS, signal transmitted from a second WD in response to the ranging signal;
    demodulating and de-spreading the received DSSS response signal to produce a received sequence;
    determining an expected sequence;
    correlating raw bits of the received sequence with raw bits of the expected sequence to determine a correlation value, the correlation value being indicative of an extent to which the received sequence matches the expected sequence;
    comparing the correlation value to a predetermined threshold, T; and
    when the correlation value exceeds the threshold, T, then:
    recording a time of reception of the received DSSS response signal; and
    determining a geo-location of the second WD based at least in part on the time of transmission of the ranging signal and the time of reception of the DSSS response signal.

2. The method of claim 1, wherein the transmitted ranging signal is one of a return-to-send, RTS, signal and a data null signal.

3. The method of claim 1, further comprising determining parameters of the ranging signal by one of selecting a WD receiver address, RA, to be used as a medium access control, MAC, address of the second WD, selecting a MAC address to be used as a wireless transmitter address, TA, and selecting a duration value.

4. The method of claim 1, wherein the determination of the raw bits of the expected sequence includes:
    constructing medium access control, MAC, header bits based on using a transmitter address, TA, of the ranging signal as a receiver address, RA, of the DSSS response signal;
    add preamble and header bits to the MAC header bits to produce a packet; and
    scramble the packet using a predetermined seed to produce the raw bits of the expected sequence.

5. The method of claim 1, wherein a likelihood of correctly determining that a valid ranging signal has been received is greater when the determination that a valid ranging signal has been received is based on correlation than when the determination that a valid ranging signal has been received is based on a frame checksum.

6. The method of claim 1, further comprising determining a time associated with the received sequence when a valid ranging signal has been received.

7. The method of claim 1, wherein the threshold, T, depends at least in part on a bit error probability, Pb, the bit error probability, Pb, being based on a signal to noise ratio (SNR).

8. The method of claim 7, wherein the threshold, T, in percent is given by T=100 (1-2 Pb).

9. The method of claim 1, wherein the expected sequence includes a 304 bit sequence that includes up to 96 unique bits and at least one field of variable bits.

10. The method of claim 1, further comprising receiving a subsequent spread spectrum signal when the threshold, T, is not exceeded for a predetermined time.

11. A first wireless device (WD), comprising:
    a transceiver configured to transmit a ranging signal and receive a direct sequence spread spectrum, DSSS, signal from a second WD in response to the ranging signal;
    processing circuitry in communication with the transceiver, the processing circuitry configured to:

de-spread the received DSSS signal to produce a received sequence; and determine an expected sequence; and a correlator in communication with the processing circuitry, the correlator configured to:
correlate raw bits of the received sequence with raw bits of the expected sequence to determine a correlation value, the correlation value being indicative of an extent to which the received sequence matches the expected sequence;

the processing circuitry being further configured to:
compare the correlation value to a predetermined threshold, T; and
when the correlation value exceeds the threshold, T, then:
record a time of reception of the received DSSS response signal; and
determine a geo-location of the second WD based at least in part on a time of transmission of the ranging signal and the time of reception of the DSSS response signal.

12. The WD of claim 11, wherein the transmitted ranging signal is one of a return-to-send, RTS, signal and a data null signal.

13. The WD of claim 11, further comprising determining parameters of the ranging signal by one of selecting a WD receiver address, RA, to be used as a medium access control, MAC, address of the second WD, selecting a MAC address to be used as a wireless transmitter address, TA, and selecting a duration value.

14. The WD of claim 11, wherein the determination of the raw bits of the expected sequence includes:
constructing medium access control, MAC, header bits based on using a transmitter address, TA, of the ranging signal as a receiver address, RA, of the DSSS response signal;
add preamble and header bits to the MAC header bits to produce a packet; and
scramble the packet using a predetermined seed to produce the raw bits of the expected sequence.

15. The WD of claim 11, wherein a likelihood of correctly determining that a valid ranging signal has been received is greater when the determination that a valid ranging signal has been received is based on correlation than when the determination that a valid ranging signal has been received is based on a frame checksum.

16. The WD of claim 11, further comprising determining a time associated with the received sequence when a valid ranging signal has been received.

17. The WD of claim 11, wherein the threshold, T, depends at least in part on a bit error probability, Pb, the bit error probability, Pb, being based on a signal to noise ratio (SNR).

18. The WD of claim 17, wherein the threshold, T, in percent is given by T=100 (1-2 Pb).

19. The WD of claim 11, wherein the expected sequence includes a 304 bit sequence that includes up to 96 unique bits and at least one field of variable bits.

20. The WD of claim 11, further comprising receiving a subsequent spread spectrum signal when the threshold, T, is not exceeded for a predetermined time.

21. An airborne station, comprising:
a transceiver configured to:
transmit a ranging signal, the ranging signal being one of a return-to-send, RTS, signal and a data null signal; and
receive a direct sequence spread spectrum, DSSS, signal from a ground station, the DSSS signal being spread by an 11 bit barker code;
processing circuitry configured to:
de-spread the received DSSS signal to produce a received sequence, the received sequence having one of a Clear To Send (CTS) signal and an acknowledgement (ACK) signal;
obtain an expected sequence;
correlate the received sequence with the expected sequence to determine a correlation value, the correlation value being indicative of an extent to which the received sequence matches the expected sequence;
compare the correlation value to a threshold, T, the threshold, T, being based on a bit error probability, which in turn is based on a signal to noise ratio (SNR); and
when the correlation value exceeds the threshold, T:
determine a time associated with the received sequence; and
determine a range of a wireless device (WD) based on the time associated with the received sequence.

* * * * *